(12) United States Patent
Min et al.

(10) Patent No.: US 10,468,022 B2
(45) Date of Patent: Nov. 5, 2019

(54) MULTI MODE VOICE ASSISTANT FOR THE HEARING DISABLED

(71) Applicant: Motorola Mobility LLC, Chicago, IL (US)

(72) Inventors: Jun-ki Min, Chicago, IL (US); Mir Farooq Ali, Rolling Meadows, IL (US); Navin Tulsibhai Dabhi, Sunnyvale, CA (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/477,918

(22) Filed: Apr. 3, 2017

(65) Prior Publication Data

US 2018/0286392 A1   Oct. 4, 2018

(51) Int. Cl.
| | |
|---|---|
| G10L 15/22 | (2006.01) |
| G06F 3/01 | (2006.01) |
| G10L 15/26 | (2006.01) |
| G06K 9/00 | (2006.01) |
| G06F 3/0482 | (2013.01) |
| G10L 15/30 | (2013.01) |

(52) U.S. Cl.
CPC .............. G10L 15/22 (2013.01); G06F 3/017 (2013.01); G06F 3/0482 (2013.01); G06K 9/00355 (2013.01); G10L 15/265 (2013.01); G06K 9/00228 (2013.01); G10L 15/30 (2013.01); G10L 2015/226 (2013.01)

(58) Field of Classification Search
CPC .............................. G10L 15/22; G10L 15/265

USPC ........................................................ 704/275
See application file for complete search history.

(56) References Cited

U.S. PATENT DOCUMENTS

| | | | | |
|---|---|---|---|---|
| 4,985,697 | A * | 1/1991 | Boulton | G09B 5/065 |
| | | | | 704/258 |
| 7,551,980 | B2 * | 6/2009 | Sakagami | G05D 1/0251 |
| | | | | 318/568.16 |
| 9,996,157 | B2 * | 6/2018 | Chaudhri | G06F 3/0412 |
| 10,225,366 | B1 * | 3/2019 | Chou | H04L 51/00 |
| 2003/0013073 | A1 * | 1/2003 | Duncan | G09B 5/02 |
| | | | | 434/317 |
| 2005/0132420 | A1 * | 6/2005 | Howard | G06F 3/017 |
| | | | | 725/135 |
| 2005/0257174 | A1 * | 11/2005 | Wilson | G06F 3/0346 |
| | | | | 715/863 |
| 2006/0136846 | A1 * | 6/2006 | Im | G06F 3/017 |
| | | | | 715/863 |
| 2007/0057912 | A1 * | 3/2007 | Romriell | G06F 3/017 |
| | | | | 345/156 |
| 2009/0265627 | A1 * | 10/2009 | Kim | G06F 1/1626 |
| | | | | 715/702 |
| 2012/0075184 | A1 * | 3/2012 | Madhvanath | G10L 15/22 |
| | | | | 345/161 |
| 2012/0166365 | A1 * | 6/2012 | Tur | G06N 5/022 |
| | | | | 706/11 |
| 2012/0324213 | A1 * | 12/2012 | Ho | G06F 1/1626 |
| | | | | 713/100 |

(Continued)

*Primary Examiner* — Daniel C Washburn
*Assistant Examiner* — Oluwadamilola M Ogunbiyi
(74) *Attorney, Agent, or Firm* — John L. Rogitz (57) ABSTRACT

A voice assistant (VA) can switch between a voice input mode, in which the VA produces audible responses to voice queries, and a gesture input mode that can be triggered by a predetermined gesture, in which the VA produces visual responses to gesture-based queries.

20 Claims, 6 Drawing Sheets

(56) References Cited

U.S. PATENT DOCUMENTS

| | | | |
|---|---|---|---|
| 2013/0053007 A1* | 2/2013 | Cosman | G06F 3/017 455/414.3 |
| 2013/0108994 A1* | 5/2013 | Srinivasa | G09B 21/009 434/156 |
| 2013/0138424 A1* | 5/2013 | Koenig | G06F 17/271 704/9 |
| 2013/0159938 A1* | 6/2013 | James | G06F 3/038 715/863 |
| 2013/0211843 A1* | 8/2013 | Clarkson | G06F 3/017 704/275 |
| 2013/0238331 A1* | 9/2013 | Mikan | H04L 51/043 704/235 |
| 2014/0058584 A1* | 2/2014 | Weng | G06F 7/00 701/1 |
| 2014/0088970 A1* | 3/2014 | Kang | G06F 3/167 704/260 |
| 2014/0139422 A1* | 5/2014 | Mistry | G06F 3/014 345/156 |
| 2014/0156269 A1* | 6/2014 | Lee | G06F 1/3206 704/231 |
| 2014/0181715 A1* | 6/2014 | Axelrod | G06F 3/0487 715/771 |
| 2014/0320394 A1* | 10/2014 | Costanzo | G06F 1/1694 345/156 |
| 2015/0026620 A1* | 1/2015 | Kwon | G06F 3/04845 715/770 |
| 2015/0046157 A1* | 2/2015 | Wolff | G10L 15/22 704/231 |
| 2015/0100323 A1* | 4/2015 | Kozuka | G06F 3/017 704/275 |
| 2015/0169218 A1* | 6/2015 | Cromer | G06F 3/04886 715/773 |
| 2015/0234475 A1* | 8/2015 | Latta | G06F 3/017 345/156 |
| 2015/0279370 A1* | 10/2015 | Koetz | A47J 43/0716 366/241 |
| 2015/0309578 A1* | 10/2015 | McCoy | G06F 3/017 715/863 |
| 2015/0334338 A1* | 11/2015 | Lim | H04N 21/4108 348/515 |
| 2015/0355802 A1* | 12/2015 | Shiomi | G06F 3/04883 715/771 |
| 2015/0363409 A1* | 12/2015 | Wood | G06F 16/44 707/738 |
| 2015/0371663 A1* | 12/2015 | Gustafson | G10L 15/265 704/270.1 |
| 2015/0382047 A1* | 12/2015 | Van Os | G10L 15/22 725/38 |
| 2016/0026253 A1* | 1/2016 | Bradski | G02B 27/225 345/8 |
| 2016/0034249 A1* | 2/2016 | Lee | G06F 3/167 704/275 |
| 2016/0104484 A1* | 4/2016 | Chakladar | G10L 15/22 704/235 |
| 2016/0259037 A1* | 9/2016 | Molchanov | G06F 3/011 |
| 2017/0116986 A1* | 4/2017 | Weng | G10L 15/22 |
| 2017/0289766 A1* | 10/2017 | Scott | H04W 4/023 |
| 2017/0330561 A1* | 11/2017 | Nakatsu | G06F 3/165 |
| 2018/0081622 A1* | 3/2018 | Taki | G06F 3/167 |
| 2018/0278922 A1* | 9/2018 | Boesen | H04N 13/363 |
| 2018/0335908 A1* | 11/2018 | Kim | G06Q 50/01 |
| 2019/0094981 A1* | 3/2019 | Bradski | H04N 13/204 |

* cited by examiner

Figure. Two modes Virtual Assistant device. Left: voice-interaction mode, Right: gesture/display mode

MULTI MODE VOICE ASSISTANT FOR THE HEARING DISABLED

FIELD

The present application relates to technically inventive, non-routine solutions that are necessarily rooted in computer technology and that produce concrete technical improvements.

BACKGROUND

Virtual assistants (VAs) such as Alexa, Google Assistant, Cortana, and Siri (all of which are trademarked) conveniently allow people to schedule meetings, set an alarm clock, look up weather, etc. by simply saying a command. This speech-based (not necessarily voice-based) interface is natural to use because it replicates the natural conduct of people in their daily interaction between other people. As understood herein however, it is almost impossible for hearing-impaired people to use those digital assistants, since the main interface is voice-based. While manually input queries may be supported voice or sign language input typically is an easier and faster to interact with VAs.

SUMMARY

Present principles addresses the problem noted above by capturing free space gestures (such as sign language, predefined or user-defined gestures (application-specific), natural gestures such as waving hands for good-bay, pointing gestures, etc.) and providing visual output via a visual display, such as a projector or LCD. A single VA has at least two modes capable of accommodating hearing impaired and other people, namely, a first mode providing voice responses and in some cases visual responses as well to voice activations and a second mode, for the hearing-impaired, providing visual responses to gesture (sign language) activations, to avoid the necessity of forcing the hearing-impaired to use a keyboard to input queries.

Accordingly, in one aspect a device includes a processor and storage accessible to the processor and having instructions executable by the processor to establish a first input mode to a voice assistant (VA). The first input mode includes voice input to a microphone. The instructions are executable to receive an input, and responsive to the input, switch to a second input mode to the VA. The second input mode includes gesture input to at least one sensor.

The input that switches modes may be a gesture in free space.

The sensor can include a camera or a radar device. Other sensors that can be used to capture gestures include accelerometer/gyroscope-equipped wearable devices such as a bracelet-like fitness tracker, a ring-type, a neckless type, an ultrasonic sensor which can capture the noise of motion, or an IR sensor.

The sensor can be held on a wearable device attachable to a person such as to clothing, or on the VA. The VA can output responses on a speaker in the first input mode and on a visual display in the second input mode.

In another aspect, a method includes configuring a voice assistant (VA) in an audible mode in which audible output is generated responsive to voice input. The method includes emitting radar signals toward a user and receiving reflections of the signals. Responsive to identifying that the reflections indicate a first gesture, referred to herein as a "trigger" gesture, the VA is configured in a gesture mode in which visible output is generated responsive to gesture input.

In another aspect, an apparatus includes a processor, a network adapter, and storage with instructions executable by the processor for configuring a voice assistant (VA) in a voice input mode, in which the VA produces audible responses to voice queries. The instructions are executable for, responsive to a first input, switch configuration of the VA to a gesture input mode, in which the VA presents visual responses to gestures in free space.

The details of present principles, both as to their structure and operation, can best be understood in reference to the accompanying drawings, in which like reference numerals refer to like parts, and in which:

DETAILED DESCRIPTION

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network. The devices may employ services and applications such as ride-sharing applications, restaurant reservation applications, and so on.

As used herein, instructions refer to computer-implemented steps for processing information in the system. Instructions can be implemented in software, firmware or hardware, or combinations thereof and include any type of programmed step undertaken by components of the system;

hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++ or Java or Swift, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
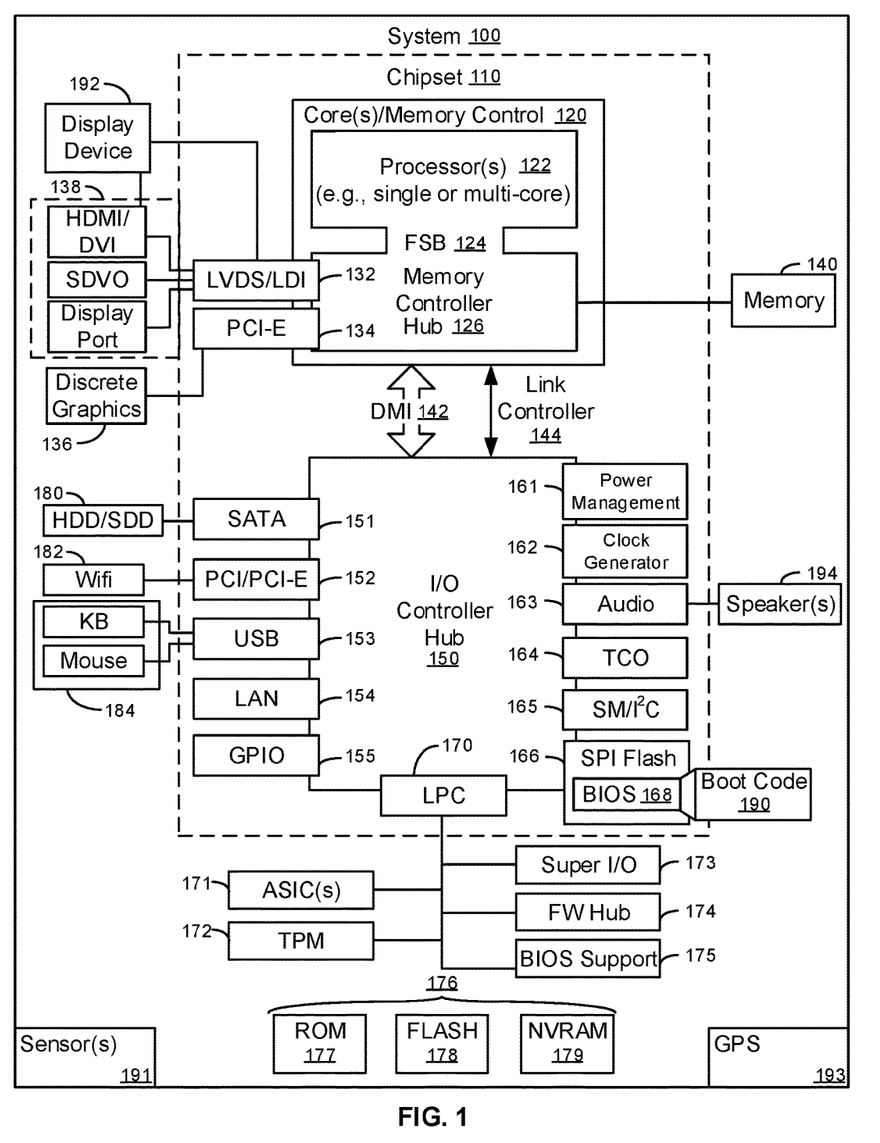
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include one or more sensors 191 from which input may be received for the system 100. For example, the sensor 191 may be an audio receiver/microphone that provides input from the microphone to the processor 122 based on audio that is detected, such as via a user providing audible input to the microphone, so that the user may be identified based on voice identification. As another example, the sensor 191 may be a camera that gathers one or more images and provides input related thereto to the processor 122 so that the user may be identified based on facial recognition or other biometric recognition. The camera may be a thermal imaging camera, a digital camera such as a webcam, a three-dimensional (3D) camera, a radar transceiver as more fully set forth below, and/or a camera otherwise integrated into the system 100 and controllable by the processor 122 to gather pictures/images and/or video. The sensor 191 may also be, for instance, another kind of biometric sensor for use for such purposes, such as a fingerprint reader, a pulse monitor, a heat sensor, etc.

The sensor 191 may even be a motion sensor such as a gyroscope that senses and/or measures the orientation of the system 100 and provides input related thereto to the processor 122, and/or an accelerometer that senses acceleration and/or movement of the system 100 and provides input related thereto to the processor 122. Thus, unique and/or particular motion or motion patterns may be identified to identify a user as being associated with the motions/patterns in accordance with present principles. One or more of the above-disclosed sensors may be present on a device consistent with present principles.

Additionally, the system 100 may include a location sensor such as but not limited to a global positioning satellite (GPS) transceiver 193 that is configured to receive geographic position information from at least one satellite and provide the information to the processor 122. However, it is to be understood that another suitable position receiver other than a GPS receiver may be used in accordance with present principles to determine the location of the system 100. In some embodiments, the GPS transceiver 193 may even establish a sensor for use in accordance with present principles to identify a particular user based on the user being associated with a particular location (e.g., a particular building, a particular location within a room of a personal residence, etc.)

It is to be understood that an example client device or other machine/computer may include fewer or more features than shown on the system 100 of FIG. 1. In any case, it is to be understood at least based on the foregoing that the system 100 is configured to undertake present principles.

The display devices divulged herein can be "built-in" display as well as "built-in" projectors. Specialized, dedicated, chip(s) may be employed for continuous (always on) gesture recognition described further below. For example, a camera or other sensor device may include a dedicated chip to handle continuous processing of those sensor data with low power.

Figure 2:
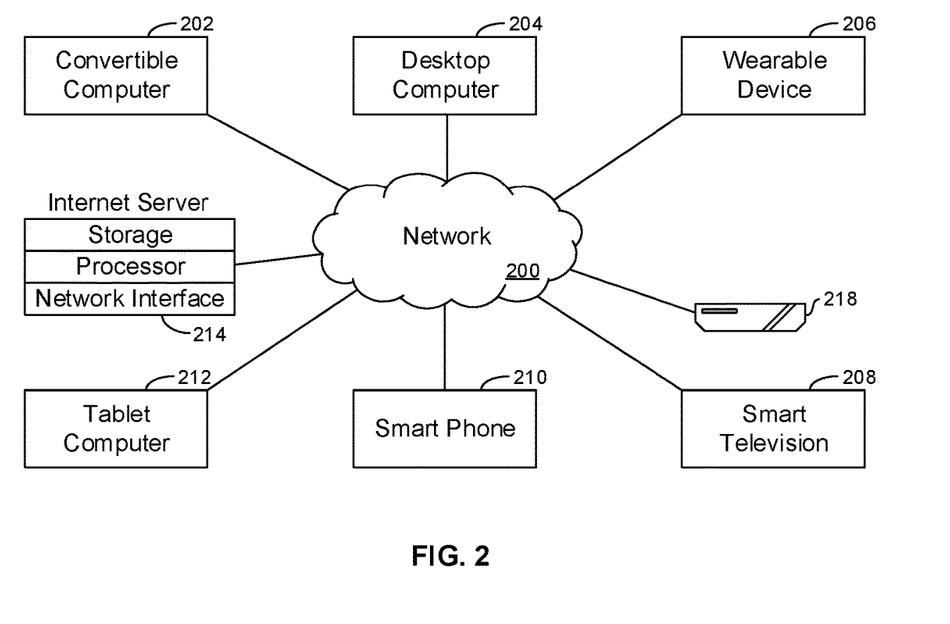
FIG. 2 is a block diagram of an example network of devices in accordance with present principles.

Turning now to FIG. 2, example devices are shown communicating over a network 200 such as the Internet or a peer-to-peer network in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a server 214 such as an Internet server that may provide cloud storage accessible to the devices shown in FIG. 2, and a game console 218. It is to be understood that the devices shown in FIG. 2 are configured to communicate with each other over the network 200 to undertake present principles.

Figure 3:
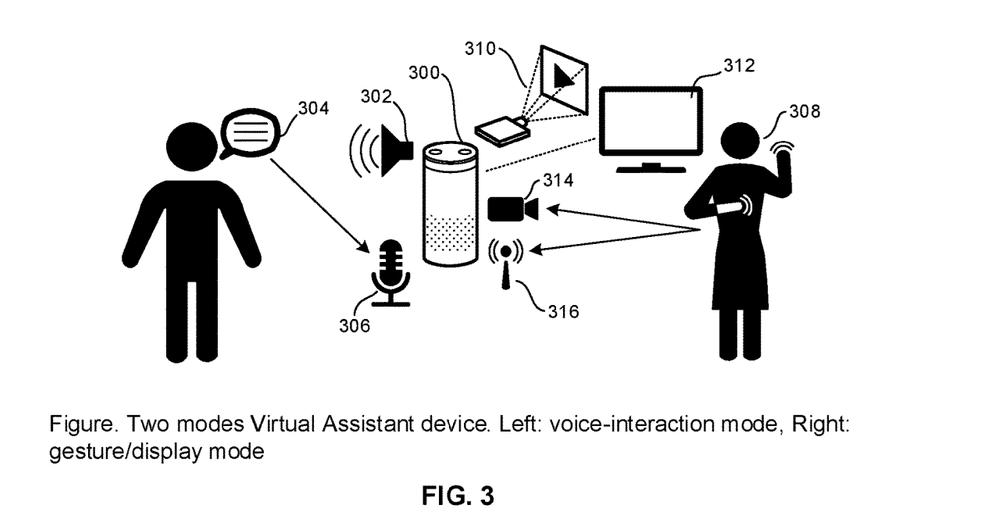
FIG. 3 is a schematic diagram illustrating multiple modes of a voice assistant (VA)

FIG. 3 illustrates a voice assistant (VA) 300 consistent with present principles that can output, on one or more speakers 302, responses to person-uttered voice commands or queries 304 received by one or more microphones 306. The VA 300 can also receive gestures in free space by a person 308 and output responses on one or more visual displays such as a projector display 310 and/or a flat panel display 312. The gestures may be imaged by one or more imagers such as by a camera 314 and/or a radar transceiver 316. The gestures as imaged are input to the VA 300 as commands/queries.

Note that the input devices and/or output devices shown in FIG. 3 may be mounted on the VA 300. One or more of the input devices and/or output devices may be mounted on components spaced from the VA 300 and wirelessly communicating therewith, such as mobile telephone, the clothing clip device described below in relation to FIG. 5, etc.

Figure 4:
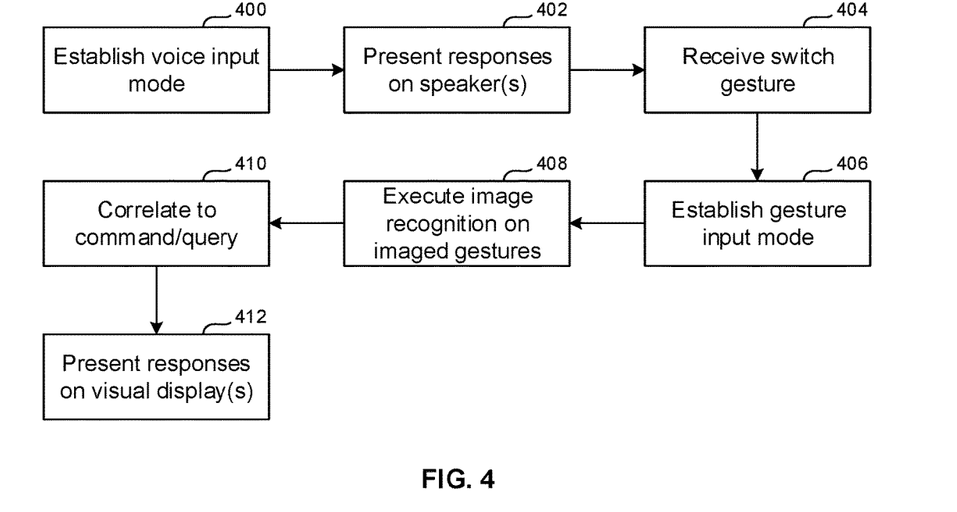
FIG. 4 is a flow chart of example logic consistent with FIG. 3.

Turning now to FIG. 4, at block 400 a voice input mode is established for a VA such as the VA 300 in FIG. 3. The voice input mode may be the default input mode. The default input mode may be established by the user employing a suitable user interface. The voice input mode may be established by a spoken word such as "voice". Yet again, a user interface (UI) may be presented on one or more of the displays shown in FIG. 3 to allow a user to select the voice input mode.

Moving to block 402, responses to subsequently received voice commands/queries are presented audibly, e.g., on the speaker(s) 302 shown in FIG. 3. As disclosed further below, the responses may also or alternatively be presented visually, e.g., on one of more of the displays shown in FIG. 3.

Moving to block 404, a switch input mode command is received. The switch input mode command may be one or more predetermined user gestures in free space captured by one or more of the imagers in FIG. 3. The switch input mode command may alternatively be selected from a UI presented on one or more of the displays shown in FIG. 3 or it may be the default mode.

Responsive to the switch command, the logic moves to block 406 to establish the gesture input mode. In the gesture input mode, when radar is used, the radar transceiver 316 shown in FIG. 3 emits electromagnetic waves in a broad beam that reflect off a gesturing user and that are received by the transceiver's receiver circuitry (or by another appropriate radar receiver). Image recognition is executed at block 408 on the resulting radar images to identify and gestures that at block 410 may be correlated, e.g., using a data structure on any of the computer storages described herein, with commands and/or queries. The gestures may be conventional sign language gestures that are correlated in the data structure with their conventional textual meaning. The commands/queries are executed and output at block 412.

To revert to the voice input mode, a user may speak the voice input activation command, and/or may make a predetermined gesture in free space. For instance, a gesture such as lifting two hands up can switch to gesture input mode, while a different gesture such as putting two hands down can switch the VA back to the voice input mode.

Note that training may be employed in one or both modes. Users can be prompted to say the activation words couple of times in the beginning of the installation. Users' motions also can be trained to, as people have different motion speed and size. Also, those individualistic motions may be used for user identification/authentication.

Figure 5:
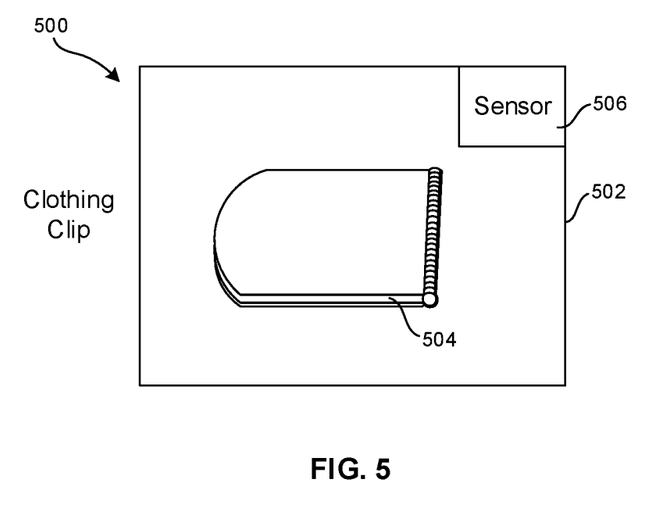
FIG. 5 is a schematic diagram of a clip-on substrate for the imager.

Present principles thus avoid the drawbacks of wearable accelerometers in recognizing gestures, namely, users do not need to present the gesture directly in front of the sensor, or wear a device on hands or arms. As shown in FIG. 5, a small clip-type device 500 with a portable housing 502 and a clip 504 thereon to attach the device 500 to the user's clothes can support a sensor 506, such as the camera or radar receiver discussed above. Or, the sensor may be implemented on a mobile device.

Figure 6:
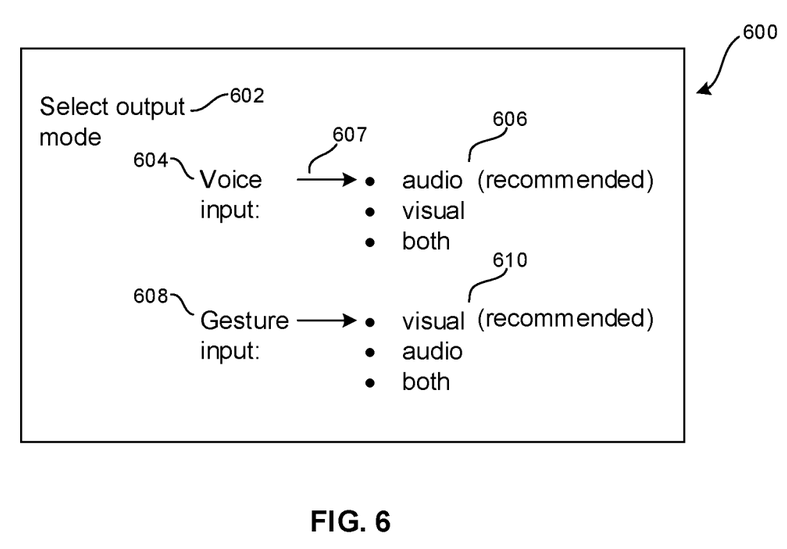
FIG. 6 is a screen shot of an example UI to allow the user to determine the outmode mode.

FIG. 6 illustrates additional features consistent with present principles. A UI 600 may be presented on any of the displays herein (including any of those shown in FIGS. 1-3) that prompts at 602 the user to select an output mode. For the voice input mode indicated at 604, the user may select an output option from a list 606. As shown, audio output is selected (as indicated by the current selection arrow 607) and is the recommended output mode as indicated by the UI.

The user may instead decide to select visual output mode, in which case responses to gestures are presented visually, such as on any of the displays described herein. Or, the user may select both audio and visual output as shown. In the gesture input mode, for example, the user may be able to select "gesture/display only" as one selection and "gesture/display+voice" as an alternative selection. This is useful when a hearing impaired person does not want to distract other people nearby (gesture/display only) or wants to involve other people in the interaction between VA (gesture/display+voice). Those selections could be made by presenting both voice (not necessarily a word, as that could be challenging to hearing impaired people) and gesture activations at the same time and/or different activation gestures (or different size/speed of activation gestures).

At 608 the UI indicates that the user may also select output mode for the gesture input mode from a list 610. As shown, visual output is selected (as indicated by the current selection arrow) and is the recommended output mode as indicated by the UI. The user may instead decide to select audio output mode, in which case responses to gestures are presented audibly, such as on any of the speakers described herein. Or, the user may select both audio and visual output as shown.

Figure 7:
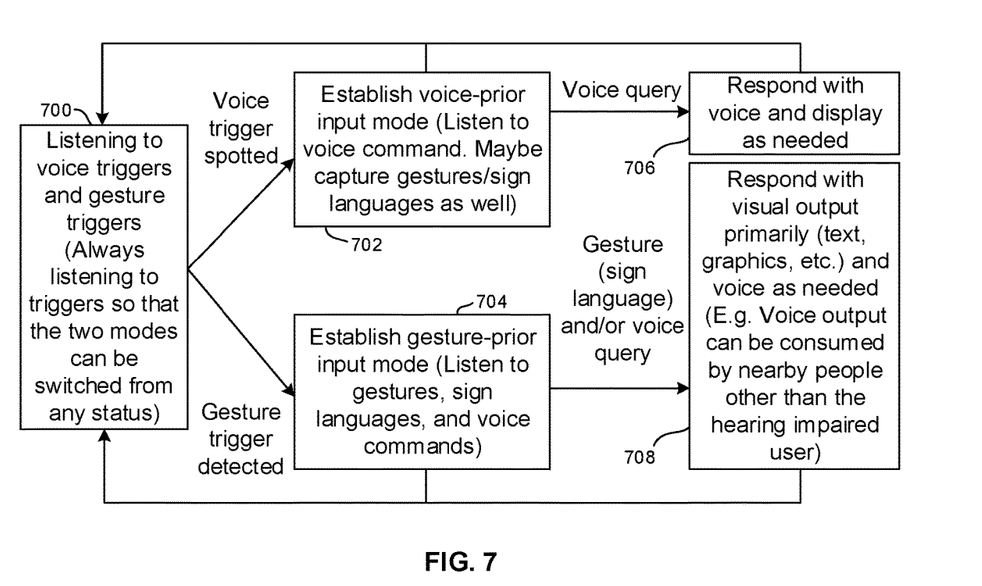
FIG. 7 is a flow chart of example logic consistent with present principles.

FIG. 7 illustrates logic that begins at block 700 by monitoring a microphone for voice triggers and a camera for detection of gesture triggers. In this embodiment, the monitoring of block 700 may always be enabled so that input mode can be switched from voice to gesture and back again at any time.

Responsive to a voice trigger being detected at block 700, the logic proceeds to block 702 to establish the above-described voice input mode, in which the microphone is monitored for indication of a subsequent voice command. In some embodiments, only voice commands from the microphone are monitored for at block 702. In other embodiments, gesture commands as indicated by the camera may also be monitored for at block 702 in addition to voice commands. The voice trigger may be a simple spoken phrase, such as "Hello Machine".

On the other hand, responsive to a gesture trigger being detected at block 700, the logic proceeds to block 704 to establish the above-described gesture input mode, in which the camera is monitored for indication of a subsequent gesture command. In some embodiments, only gesture commands imaged by the camera are monitored for at block 704. In other embodiments, voice commands detected by the microphone may also be monitored for at block 704 in addition to gesture commands. The gesture trigger may be a simple gesture such as a raised hand.

When multiple VA 300 are used or implemented in software in a single physical VA unit, each individual assistant can be invoked by its own respective voice or gesture trigger. Note that gesture triggers may be replaced by a button press or switch manipulation. Note further that when multiple assistants are implemented, assistant "A" may be invoked by a generic trigger gesture such as an upraised hand followed by signing or tracing the letter "A".

When at block 702 a voice command is detected, such as a query, e.g., "what is the weather?", the logic moves to block 706 to respond to the command by accessing an internal or network data source of weather information and returning a response to the query. The response may be audible and presented on a speaker. As mentioned above, a visual response may also be provided on a display if desired, in addition to the audible response.

When at block 704 a gesture command is detected, such as sign language spelling out a query, e.g., "what is the weather?", the logic moves to block 708 to respond to the command by accessing an internal or network data source of weather information and returning a response to the query. The response may be visual and may be provided on a display, and as mentioned previously, an audible response may also be presented on a speaker, in addition to the visual response. In this way, audible responses may be consumed by people other than the hearing-impaired person who input the gesture query and to whom the visual response is provided. The visually displayed response may be alphanumeric characters, figures, graphs, etc.

Note that at one or both of blocks 702 and 704, multiple sensor inputs can be monitored for as mentioned above and fused to increase accuracy. In an example, this may done using the following algorithm:

$$f_g(S)=C_g, \text{ where}$$

$f_g$ is a recognition function for gesture g
S is a set of sensors, $\{s_1, s_2, \ldots s_n\}$
$C_g$ is a degree of confidence for gesture g
One example of $f_g$ is given by $w_1s_1+w_2s_2+ \ldots w_ns_n$, where $w_i$ is a weight value for the $i^{th}$ sensor output $s_i$, which can be trained.

Figure 8:
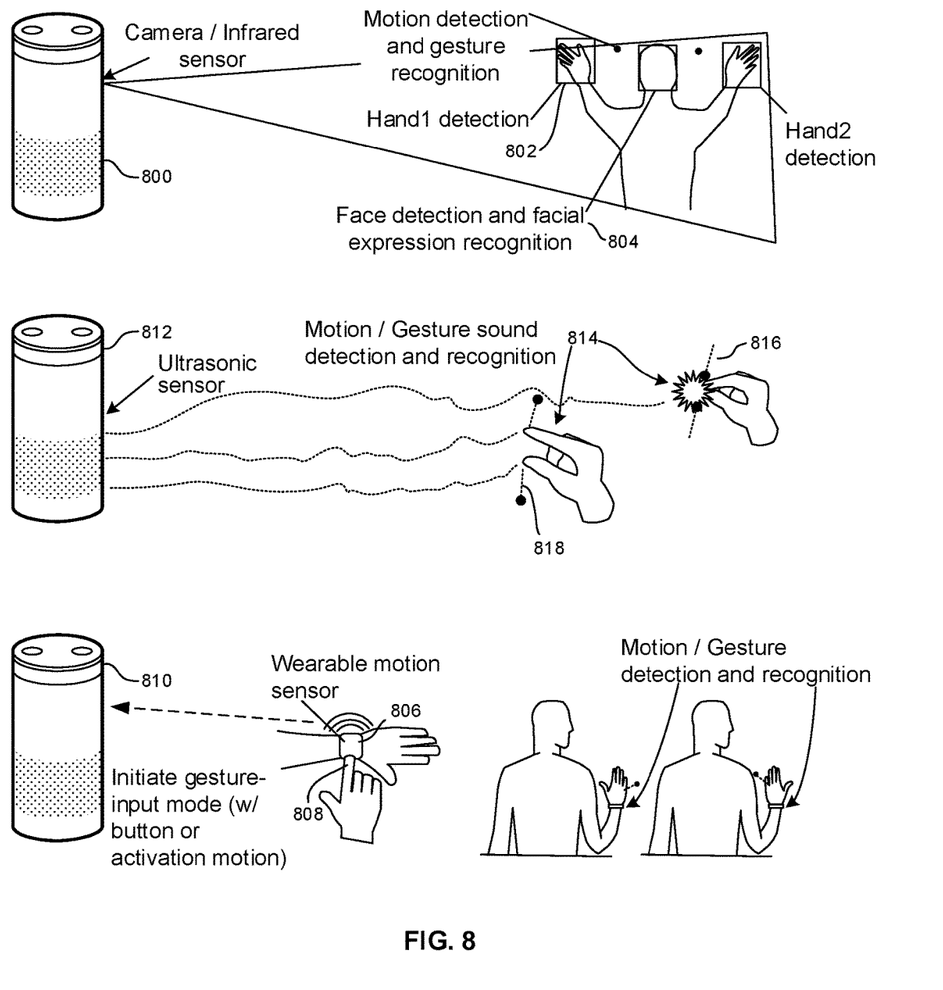
FIG. 8 is a schematic diagram illustrating fusing multiple input modes.

With the above in mind in referring briefly to FIG. 8, while camera input from a camera/IR sensor 800 is referred to above for detecting hand gestures 802 and facial expression recognition 804, other sensors may be used. For example, one or a combination of sensors may be used with cameras, such as wearable motion sensors 806 with internal motion sensors that, with the touch 808 of a button can be caused to wirelessly communicate motion signals to a wireless receiver 810 as may be implemented in a VA. The wearable sensor 806 is configured as a wristwatch as shown in the non-limiting example of FIG. 8. Also, microphones 812 (in the form of ultrasonic sensors) may be implemented in any of the Vas herein detect sound from body/hand movement 814, such as fingers snapping or opening as illustrated at 816, 818. Hardware implementations may embed in a wired manner or connect in a wireless manner input sensors (cameras, infrared sensors, wearable sensors such as accelerometers, magnetic/electronic radar sensors, microphones, ultrasonic sensors to capture motion, etc.) to output devices such as microphones, speakers, projectors, displays, screens, haptic-type output devices, etc.

Referring back to FIG. 7, the logic may continue by looping back as shown to monitoring block 700 and/or to blocks 702, 704. In one embodiment, once a specific input mode has been established at block 700, the logic loops from block 706 back to block 702, or from block 708 to block 704. Upon receipt of a "bye" gesture such as a hand wave, the logic may loop further back, to block 700, to monitor for the trigger signal.

Figure 9:
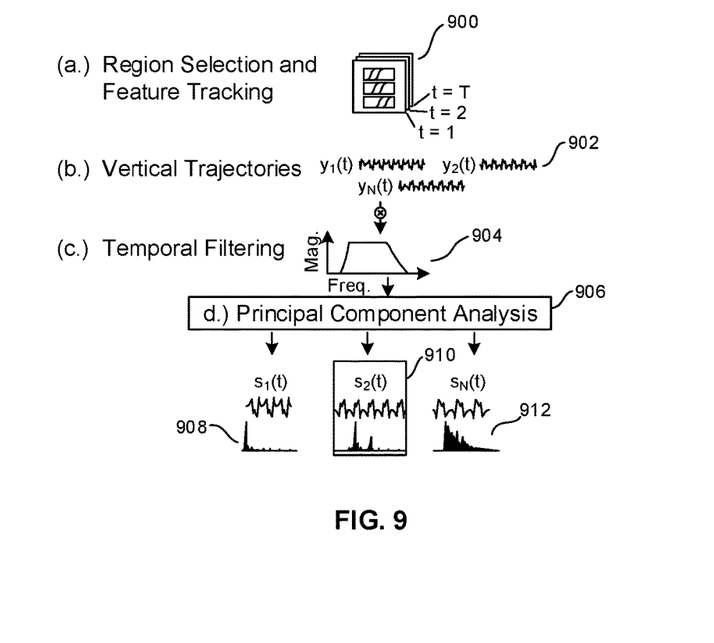
FIG. 9 is a schematic diagram illustrating the operation of an image processing algorithm to detect motion and facial expression for purposes of gesture input.

FIG. 9 illustrates an example implementation based on image processing from a camera to detect hand movements of a user. At 900 region selection and feature tracking is enabled. Vertical trajectories of the hand as a function of time are identified at 902, and temporal filtering is applied at 904, which illustrates a plot of hand motion magnitude on the y-axis versus frequency on the x-axis. Component analysis is performed at 906 to render motion magnitude outputs as a function of time 908, 910, 912 indicating in aggregate a type of gesture, which can be correlated using, e.g., a lookup table to a command to be executed.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
at least one processor; and
storage accessible to the at least one processor, the storage comprising instructions executable by the processor to:
establish at least a first input mode to a voice assistant (VA), the first input mode comprising voice input to at least one microphone;
receive at least one input;
responsive to the at least one input, switch to at least a second input mode to the VA, the second input mode comprising gesture input to at least one sensor; and
present on a display at least one user interface (UI) comprising at least first and second elements, the first and second elements being at least one of selector elements and prompts that are operable to enable respective first and second output modes in response to input in the first input mode, the UI further comprising a human-perceptible indication of a recommended output mode juxtaposed with one of the first or second elements and not the other second or first element to indicate that the output mode associated with the first or second element by which the human-perceptible indication of a recommended output mode is juxtaposed is recommended over the output mode associated with the second or first element by which the human-perceptible indication of a recommended output mode is not juxtaposed, and information in a current output mode and a third element selectable to select both output modes in response to input in the second input mode comprising gesture input.

2. The device of claim 1, wherein the at least one input comprises a gesture in free space.

3. The device of claim 1, wherein the at least one sensor comprises a camera.

4. The device of claim 1, wherein the at least one sensor comprises a radar device.

5. The device of claim 1, wherein the sensor is on a wearable device attachable to a person.

6. The device of claim 1, wherein the sensor is on the VA.

7. The device of claim 1, wherein the VA outputs responses on at least one speaker in the first input mode.

8. The device of claim 1, wherein the VA outputs responses on at least one visual display in the second input mode.

9. A method, comprising:
configuring a voice assistant (VA) in an audible mode in which audible output is generated responsive to voice input;
identifying a first gesture to switch to a gesture mode;
responsive to identifying the first gesture, configuring the VA in a gesture mode in which a response embodied by visible output is generated and visibly presented responsive to gesture input and the response is also embodied by audible output and presented responsive to the gesture input;
identifying a second gesture to switch to the audible mode;
responsive to identifying the second gesture, configuring the VA in the audible mode; and
the first gesture to configure the VA in the gesture mode being identified responsive to identifying at least one hand being held up, the second gesture to switch to the audible mode being identified responsive to identifying at least one hand being held down.

10. The method of claim 9, comprising:
emitting radar signals toward a user; and
receiving reflections of the radar signals using a sensor on a clip-type device attachable to clothing, the reflections being used to identify the first gesture.

11. The method of claim 9, comprising:
emitting radar signals toward a user; and
receiving reflections of the radar signals using a sensor on the VA, the reflections being used to identify the first gesture.

12. The method of claim 9, comprising:
emitting radar signals toward a user; and
receiving reflections of the radar signals using a sensor on a mobile communication device, the reflections being used to identify at least the first gesture.

13. The method of claim 9, comprising using input signals from at least two sensors to identify the first gesture as follows:

$f_g(S)=C_g$, where $f_g$ is a recognition function for gesture g given by $w_1 s_1 + w_2 s_2 + \ldots w_n s_n$, where $w_i$ is a weight value for the $i^{th}$ sensor output $s_i$;

S is a set of sensors, $\{s_1, s_2, \ldots s_n\}$;
$C_g$ is a degree of confidence for gesture g.

14. A device, comprising:
at least one processor; and
storage accessible to the at least one processor, the storage comprising instructions executable by the processor to:
establish at least a first input mode to a voice assistant (VA), the first input mode comprising voice input to at least one microphone;
receive at least one input;
responsive to the at least one input, switch to at least a second input mode to the VA, the second input mode comprising gesture input; and
present on a display at least one user interface (UI) comprising at least first and second elements, the first and second elements being at least one of selector elements and prompts to enable respective first and second output modes in response to input in the first input mode, the UI further comprising a human-perceptible indication of a recommended output mode juxtaposed with one of the first or second elements and not the other second or first element to indicate that the output mode associated with the first or second element by which the human-perceptible indication of a recommended output mode is juxtaposed is recommended over the output mode associated with the second or first element by which the human-perceptible indication of a recommended output mode is not juxtaposed.

15. The device of claim 14, wherein the at least one input comprises a gesture in free space.

16. The device of claim 14, comprising at least one camera to image gestures.

17. The device of claim 14, comprising at least one radar device to sense gestures.

18. The device of claim 14, comprising at least one gesture sensor on a wearable device attachable to a person.

19. The device of claim 14, comprising at least one gesture sensor on the VA.

20. The device of claim 14, wherein the VA outputs responses on at least one speaker in the first input mode.

* * * * *